United States Patent [19]
Rumpf et al.

[11] 3,873,041
[45] Mar. 25, 1975

[54] PAWL LOCK FOR RETRACTORS

[75] Inventors: Robert J. Rumpf, Grosse Pointe; Wallace C. Higbee, Romeo, both of Mich.

[73] Assignee: The Firestone Tire & Rubber Company, Akron, Ohio

[22] Filed: Sept. 10, 1973

[21] Appl. No.: 395,764

[52] U.S. Cl. .............................................. 242/107.4
[51] Int. Cl. ............................................. B65h 25/48
[58] Field of Search .................. 242/107.4, 107 SB; 297/388; 280/150 SB

[56] References Cited
UNITED STATES PATENTS

| | | | |
|---|---|---|---|
| 3,489,367 | 1/1970 | Kovacs | 242/107.4 |
| 3,632,058 | 1/1972 | Stoffel | 242/107.4 |
| 3,664,600 | 5/1972 | Sargeant | 242/107.4 |
| 3,667,698 | 6/1972 | Fisher | 242/107.4 |

*Primary Examiner*—Edward J. McCarthy
*Attorney, Agent, or Firm*—Miller, Morriss, Pappas & McLeod

[57] ABSTRACT

A pawl lock for seat belt retractors wherein a direction sensing element is operably connected to a pawl and when withdrawal of webbing from the retractor occurs, the direction sensing element is biased toward closing the pawl against a ratchet movable with movement of the retractor spool but is prevented from doing so by an interposed latch or hook element blocking the bias toward pawl closure until the latch or hook is displaced, whereupon the pawl can be tilted into locking engagement with the ratchet and so lock the retractor against further withdrawal of seat belt webbing. The moving force acting to displace the interposer or hook is condition sensitive as by volume of webbing on the retractor spool or in partial accord with retraction or an inertially activated bias. The inertial bias may be via vehicle sensitive pendulum means or by webbing acceleration sensitive means. Thus, the same basic retractor structure for seat belts is functional as an automatic locking retractor; a vehicle sensitive locking retractor; a webbing sensitive retractor; or in selected combinations of these.

The present invention is a pawl lock structure for retractors in which a spool or drum is rotated by withdrawal of webbing or harness material therefrom or retraction thereon and the lock structure senses the direction of movement of the harness and spool and biases the pawl toward closure with a cooperating lock surface such as a ratchet during withdrawal of webbing and urges the pawl away from lock engagement during retraction of webbing. The invention then includes an interrupter or arrester in the form of a latch or hook interrupting the bias toward closure until another condition overcomes the latch and repositions it. This concept, as will be seen, adapts the present retractors to accommodate vehicle sensitive inertial structures, webbing sensitive inertial structures, automatic locking structures (partial retraction releases hook or lock) and combinations of these features.

11 Claims, 16 Drawing Figures

PAWL LOCK FOR RETRACTORS

BACKGROUND OF THE INVENTION

Seat belt retractors are receptacles for webbing, cable, belting or the like harness material and the material is wound onto a spool or drum and the spool is spring biased to pick up any slack webbing. Usually the retractor includes a frame journalling the spool and supporting the spring motor which acts on the spool to rewind the webbing. The spring motor can be overcome by withdrawal of the webbing. The act of withdrawing the webbing winds the spring motor so that as the webbing is released it is respooled by the spring. The frame also supports lock means for prevention of further withdrawal of webbing. This may comprise a manual lock as by manual engagement of a pawl or stop with a ratchet flange moving with the drum or several varieties of automatic lock. The latter retractors are designated automatic locking retractors if a manipulation of the belting (slight rewind) causes the lock to occur; or, they may be called webbing sensitive inertial retractors if locking against withdrawal occurs upon accelerated withdrawal of webbing; and, where the environment conditions are sensed in relation to the inertial condition of the vehicle (rapid deceleration for example) in which such retractors are placed, then the retractors are called vehicle sensitive inertial retractors. Combinations of these are also available where one or more functional features are backed up by others. The very earliest retractors were simply spring loaded spool receptacles, the spool acting as a stop when all webbing thereon had been withdrawn. These structures started as mere housekeeping devices rolling up webbing or belting when the ends were released from buckles or other harness. Later, the devices assumed more sophisticated functions, as indicated, seeking to allow adjustability to variant body and seat conditions or to allow substantial user movement, or to lock against withdrawal when certain conditions occur. Each has a distinct utility and in general the aim of those constructing such devices has been to simplify the structure so that the maximum safety utility could be provided at the minimum price. This latter point has been essential in adapting seat belt retractors to the automotive industry. The common features of all retractors are that the spool rotates in one direction as the webbing is withdrawn and then the spool rotates in the opposite direction as the webbing is wound back onto the spool by the spring motor. The present invention utilizes the clockwise, counterclockwise rotation characteristics of the spool to provide a bias that is always in the direction of locking the retractor when the webbing is being withdrawn and is never biased toward locking the retractor under retraction or rewind conditions. A barrier to locking is interposed between the force bias toward locking. Then, an overriding force can be applied to remove the barrier permitting the locking action of the direction sensor in accord with control conditions such as inertial forces; webbing manipulation or the like causing the direction sensor to move the pawl to lock against the ratchet.

Prior art structures considered in preparation of the present application include the following U.S. Pat. Nos. and relating to seat belt retractors: Replogle 3,174,704; Fisher 3,667,698; Wohlert 3,412,952, Board 3,425,645; Stoffel 3,648,946, 3,558,075, 3,632,058, 3,604,654, 3,632,055, 3,632,056, 3,648,946; Pringle 3,603,525, 3,635,419, 3,632,057; Sargeant 3,664,600; Kovacs 3,489,367, 3,446,454; Jones 3,604,655; Romanzi 3,635,420; Rex 3,700,183 and Seeger 3,598,335. None of these references are believed to show or suggest or render "obvious" the herein expressed invention.

Accordingly, the present invention is directed to a very simple retractor base structure providing an accommodation to other control features including selected delay and which is directly linked to a pawl or lock element tending to stop rotation of the spool when webbing is withdrawn and tending to urge unlock of the spool when the webbing is under retraction force as by the rewind spring motor and in which a hook or interposer is positioned to block the locking movement and sensing means are provided to release the interposer or barrier.

The principal object is the provision of a simple direction sensitive sensor connected to the pawl or lock of a retractor.

Another object is to provide blocking or interposing means preventing actuation of the pawl or lock until a preset condition occurs affecting the blocking means.

Another object is to provide vehicle sensitive inertial retractors in a much simplified form and where the vehicle sensitive inertial functions may be integrated with webbing sensitive concepts and automatic locking features.

Other objects including vast simplification of structure and convertability of retractor structures with attendant economies will be increasingly appreciated as the description proceeds.

GENERAL DESCRIPTION

In general, a U-shaped or channel-like frame is provided and the uprights of the frame provide means for journalling a drum or spool therebetween and the drum or spool is a receptacle for belting, webbing, cable or the like used in connection with safety belt harness and the like. The drum is rotated in one direction for withdrawal of webbing and in the opposite direction for retraction of webbing therefrom. The rewinding is accomplished by a spring motor. A ratchet is made a part of or is secured to the spool and may be a part of one or more of the flanges of the spool. A pawl is also provided which moves into and out of an interference path between the teeth of the ratchet. On return of webbing to the drum, the pawl is biased away from lock engagement with the ratchet so that rewind or retraction is unimpeded whenever retraction of the webbing is occurring. When webbing is initially withdrawn so that the means achieving the bias toward locking is to be disabled, then the direction of rotation must be sensed and the rotation of the pawl toward locking prevented until an enabling condition arms the pawl by removal of the physical block. When this occurs, the pawl must be freed to fall via its operating bias into lock engagement with the ratchet. Then, on rewind, the pawl must be backed out of contact with the ratchet in avoidance of noise or chatter. This is accomplished by the placement of a direction sensing member on the shaft of the spool or drum so that friction therebetween causes the sensing member to rotate in accord with the direction of the movement of the drum and can slip on the shaft of the drum. The direction sensing member is generally bifurcated and two arms project radially from the direction sensing member. One of the arms is connected to the pawl and when webbing is being withdrawn from the drum or spool, the arm tends toward closing the pawl against the ratchet but for the prevention of rotation by reason of the disabling latch or hook which selectively prevents rotation of the direction sensing structure. Finally, a condition sensing element is connected to the disabling hook or latch. When the condition sensing element disconnects the disabling latch or hook, then further withdrawal of webbing provides unimpeded impetus to the pawl, closing the pawl against the ratchet and hence locking the retractor. As will be appreciated, the condition sensing means may be conditioned to dislodge the hook on slight retraction or inertial means may be used to release or dislodge the hook and the inertial means may be vehicle sensitive, webbing sensitive (acceleration of webbing withdrawal) or combinations of these.

For example, the hook may be dislodged from blocking rotation of the direction sensing means by using a webbing sensor to engage one arm of the direction sensor so that upon a predetermined withdrawal or free pull of webbing, further slight retraction (causing counter-rotation of the direction sensor) frees the hook and a spring finger biases it away from disabling engagement. Subsequent withdrawal closes the pawl on the ratchet flanges and locks the retractor. Release of tension on the webbing causes the windup spring to retract the webbing on the spool by rewind of the spool and the pawl falls free and is moved by the direction sensor away from ratchet contact of the ratchet obeying the direction sensing force of the direction sensor arm and the kick-out action of the ratchet teeth against the pawl.

Similarly, the blocking of the rotation of the direction sensing member can be controlled by an inertial device, as for example, a pendulum or an arm actuated by a pendulum thereby allowing the direction sensor to close the pawl on the ratchet on any further withdrawal or tendency toward withdrawal from the drum. The inertial sensitivity may be vehicle sensitive, webbing sensitive and made universally sensitive to inertial imbalance or unidirectionally sensitive, or combinations of these to provide back-up functions, as required in safety harness situations.

When spool, drum, reel, or the like is used herein, it has reference to the receptacle for webbing, cable or other harness material coiled thereon and unwound therefrom, the spool, drum or reel having a retractor motor secured thereto which biases the drum on its journals to fully wound condition.

Figure 5:
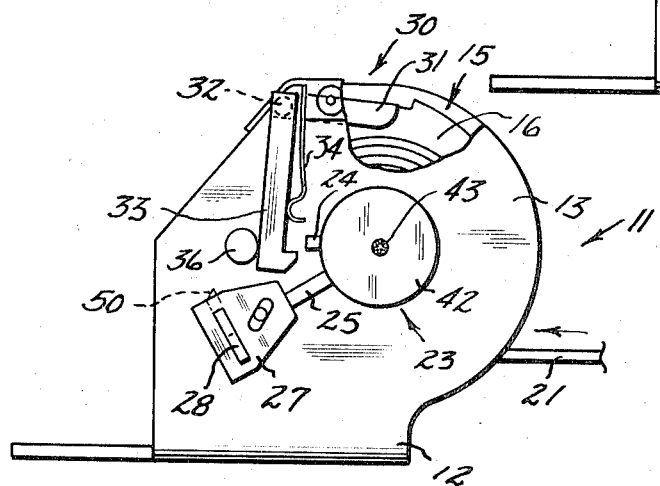

FIG. 5 indicates release of the direction sensor by the hook or latch on slight retraction of webbing and thus arming the direction sensor lock for moving the pawl.

Figure 3:
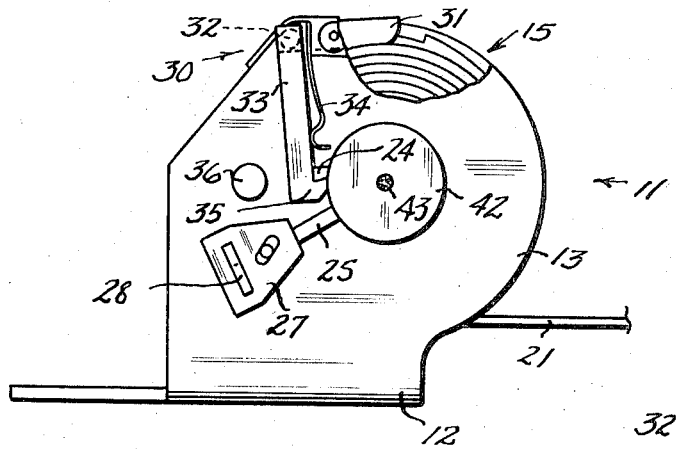
FIG. 3 is a profile elevation view of the structure shown in FIG. 1 with a full spool.
Figure 4:
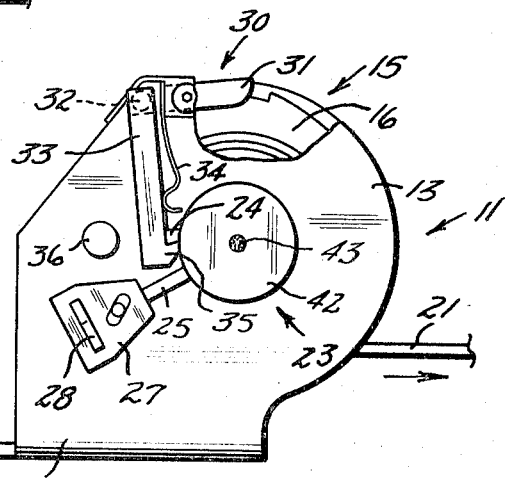
FIG. 4 is a profile view as in FIG. 3 but with webbing being withdrawn from the spool and the latch or hook interposer holding the direction sensitive element from locking the pawl so long as withdrawal continues.
Figure 6:
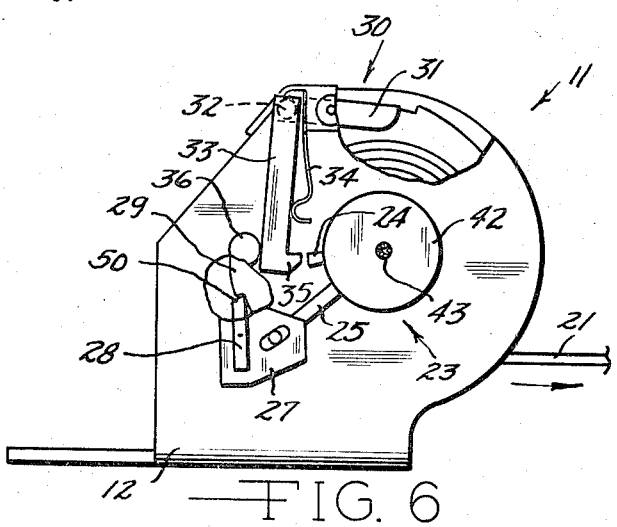

FIG. 6 shows the same structure as seen in FIGS. 3, 4 and 5 but with pawl locked by the movement of the direction sensor in accord with withdrawal force on the webbing and clear of the interposer or hook.

Figure 7:
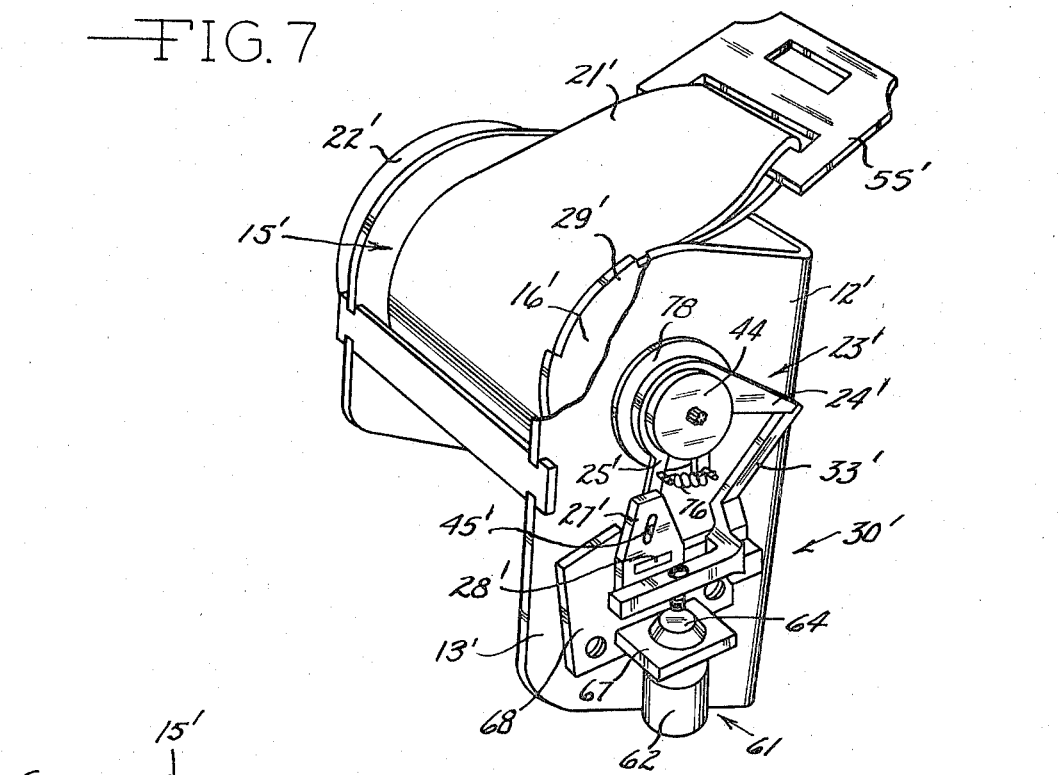

FIG. 7 is a perspective view of a retractor in accord with the present invention and whereas the direction sensor element is coordinated with a vehicle sensitive inertial element which releases the interposer or hook.

Figure 8:
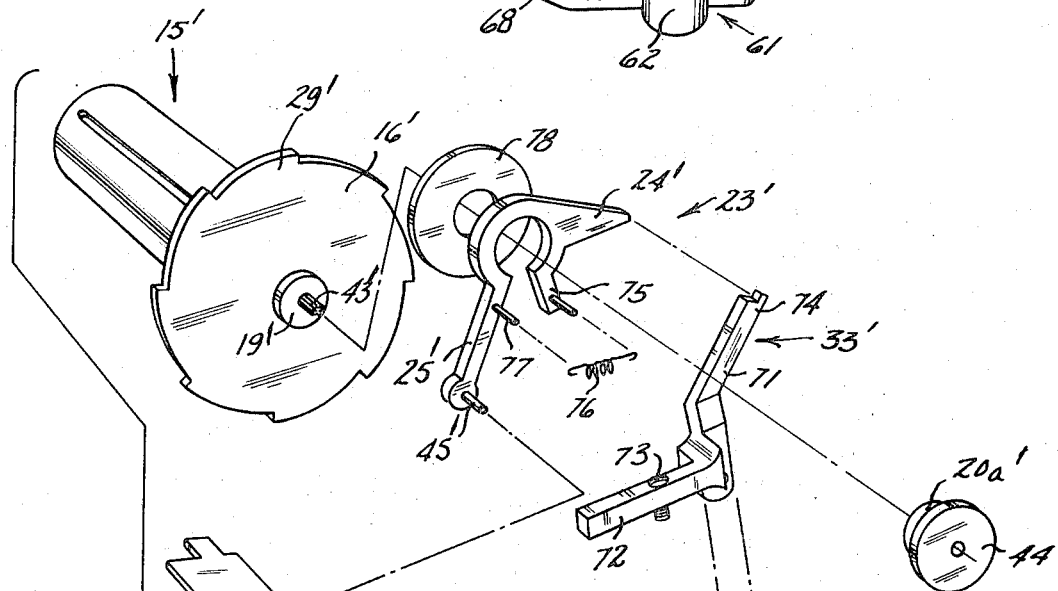

FIG. 8 is a partial exploded perspective view of the pawl lock mechanism shown in FIG. 7.

Figure 9:
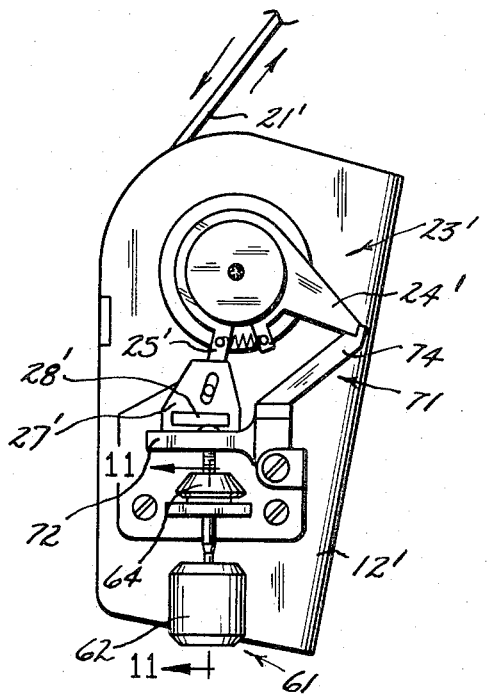

FIG. 9 is a side elevation profile view of the retractor shown in FIGS. 7 and 8.

Figure 10:
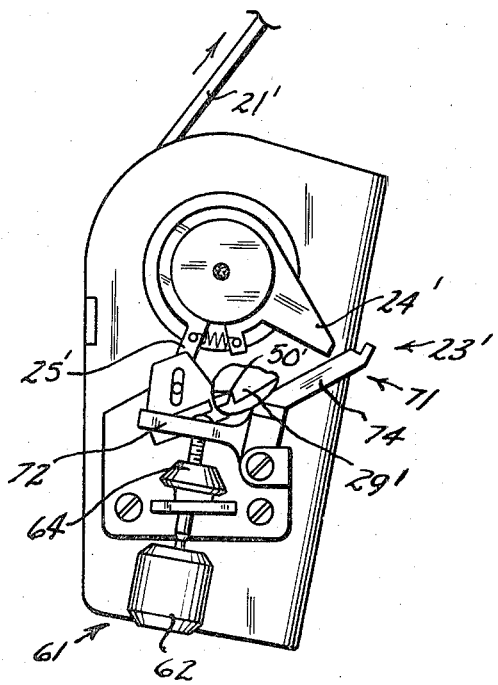

FIG. 10 is a side elevation profile view of the structure shown in FIG. 9 as poised sensing inertial change in condition as deceleration and displacing the interposer latch or hook thereby allowing locking of the pawl to the ratchet on any further tendency of withdrawal of webbing from the spool.

Figure 11:
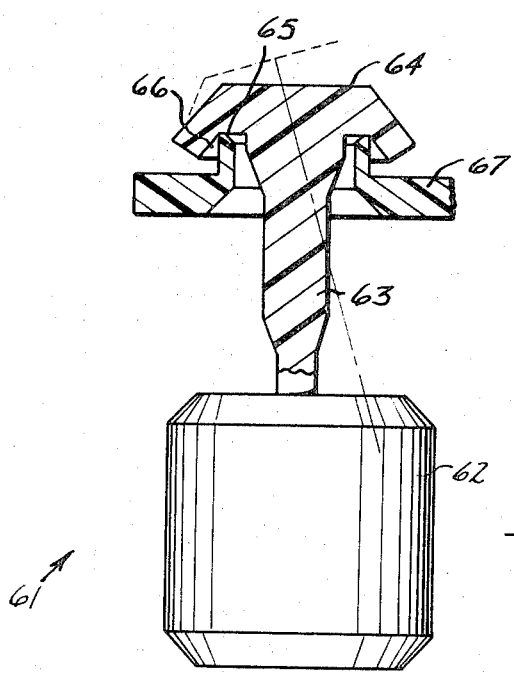

FIG. 11 is a partial cross section elevation view taken through the pendulum stem and indicating the circular knife edge construction of the pendulum type inertial sensor.

Figure 12:
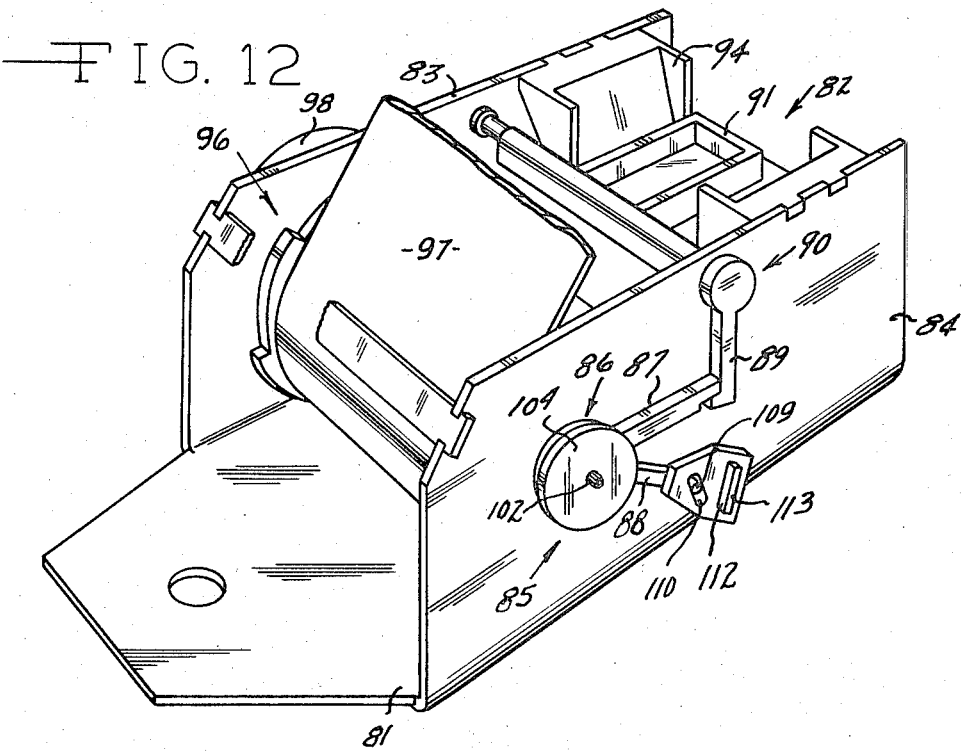

FIG. 12 is a perspective view of a retractor in accord with the present invention and having a variation in vehicle sensitive inertial construction selectively blocking the direction sensitive element for acting on the pawl until an inertial imbalance occurs.

Figure 13:
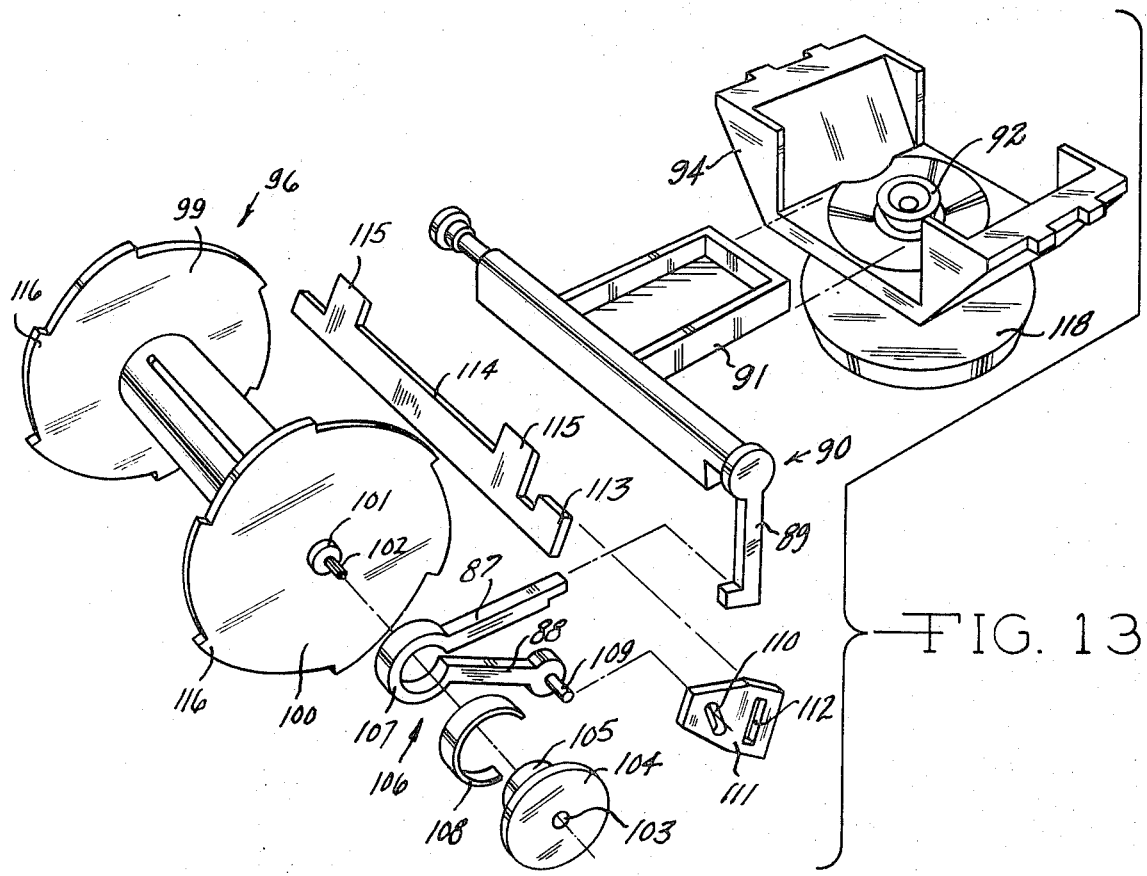

FIG. 13 is an exploded perspective view of the vehicle sensitive inertial structure shown in FIG. 12 and indicating the construction and assembly of the operating elements.

Figure 14:
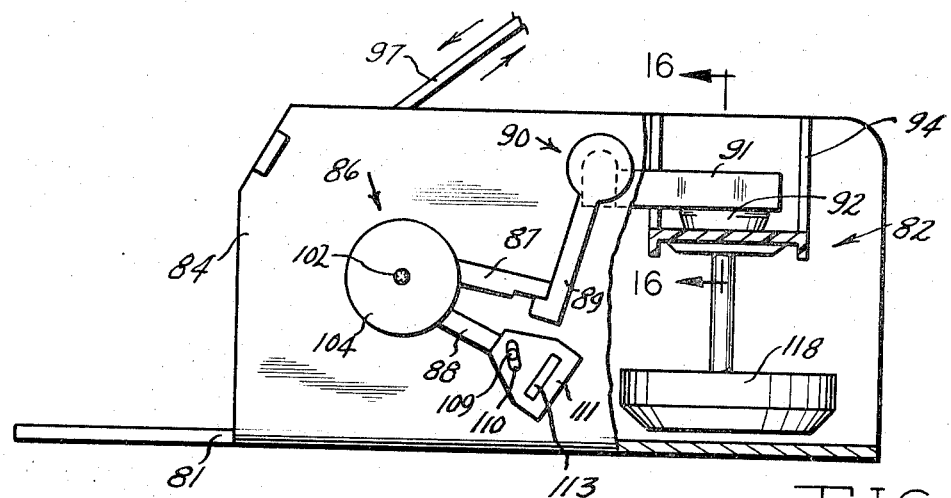

FIG. 14 is a partially cut-away side elevation view of the structure seen in FIGS. 12 and 13 and shown under equilibrium conditions where the webbing is freely movable on or off of the spool.

Figure 15:
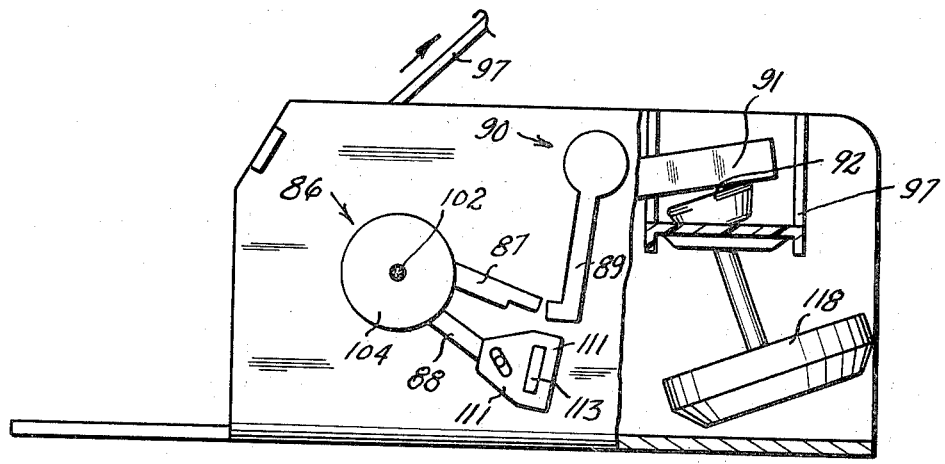

FIG. 15 is an elevation view as seen in FIG. 14 where the pendulum is inertially displaced releasing the direction sensitive element to close the pawl on the ratchet of the spool.

Figure 16:
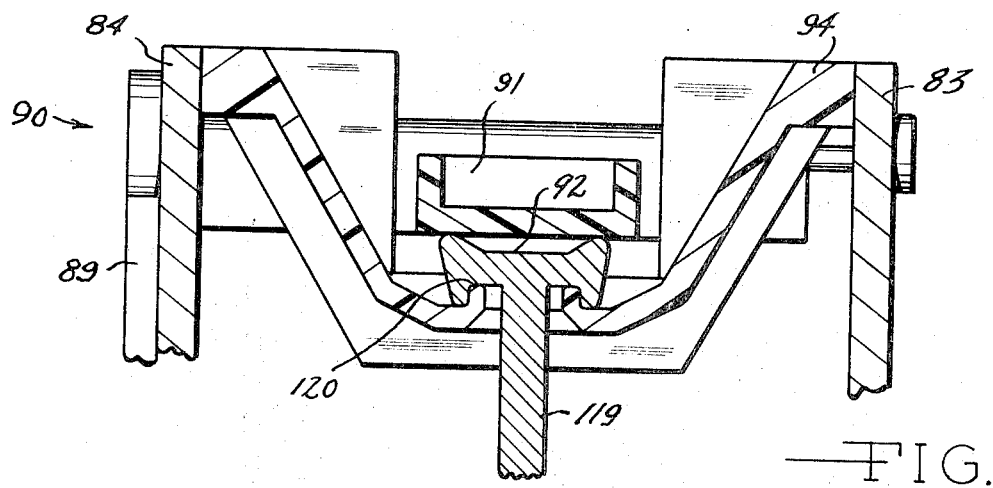

FIG. 16 is an illustration of the pendulum structure of the structure seen in FIGS. 12, 13, 14 and 15.

SPECIFIC DESCRIPTION

Figure 1:
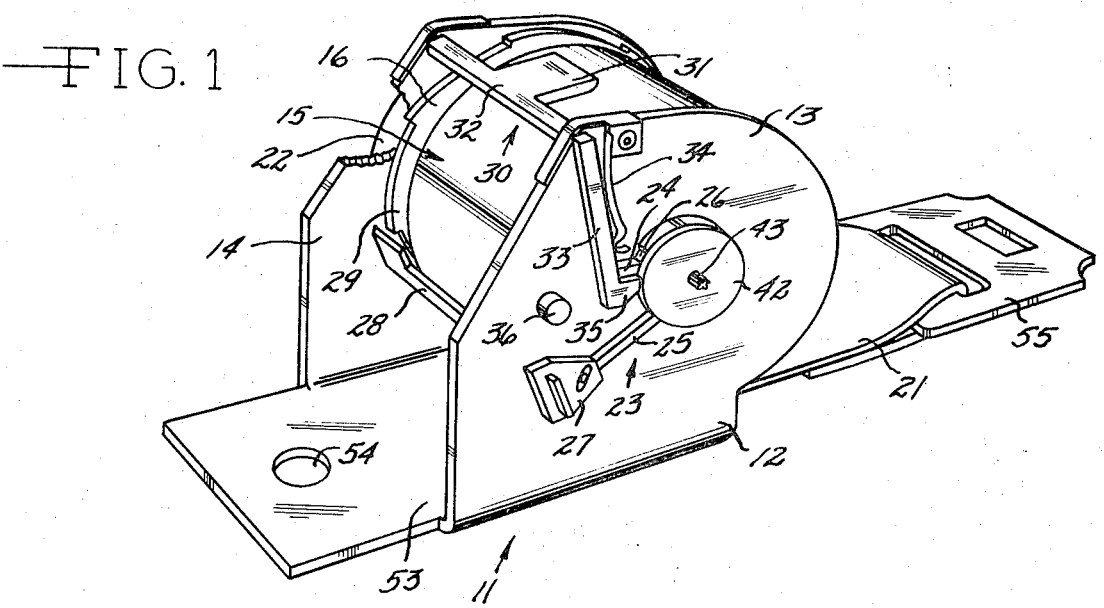
FIG. 1 is a perspective view of a typical retractor including the pawl lock structure of the present invention.

Referring to the drawings and with particularity to the FIG. 1 thereof, a pawl lock structure of the present invention is illustrated in use on the retractor 11. The retractor 11 comprises a generally U-shaped or channel shaped frame 12 and the flanges 13 and 14 of the frame 12 support and journal the spool, drum, or reel 15. As will be seen in FIG. 2, the spool 15 includes ratchet flanges 16 and 17 on a spindle 18 supported on the shaft 19. The shaft 19 has a stub portion or shoulder 20 which extends beyond the flange 13 of the frame 12. Webbing 21 is wound on the drum 15 and is urged on the reel 15 by a spring motor 22 shown encased or covered and secured to the frame 12 and acting on the shaft 19 to accomplish retraction. Such motors 22 are well known and no further description is believed to be required. A direction sensing assembly 23 is frictionally provided around the shaft 19 so that the arms 24 and 25 of the bifurcated yoke element 26 both move as the yoke 26 moves and as the shaft 19 moves. The longest arm 25 extends generally radially and is connected to a pawl moving cam or plate 27 so that motion of the arm 25 translated through the plate 27 tilts the pawl 28 (in the form of a bar spanning the gap in the frame 12) toward and away from lock engagement with the teeth 29 on the ratchet flanges 16 and 17 depending on the direction of rotation of the spool or drum 15.

A condition sensor 30 in control of a barrier to the direction sensor 23 is provided and comprises a webbing contact extension 31, and a shaft portion 32 which is pivotally mounted between the upstanding flanges 13 and 14 of the frame 12 and the contact extension 31 in the structure of FIGS. 1–6 projects outward in an interference path with webbing 21. The projection is predetermined so that as a particular quantity of webbing 21 is spooled as by retraction of the webbing 21, the condition sensor 30 is rotated on its shaft 32. The rotation of the shaft 32 in its follower relationship causes corresponding rotational movement of an interposer or hook arm 33, following the accumulation of webbing 21. As will be seen, the following relationship is maintained by a spring 34 secured to the frame 12 and acting on the interposer or hook 33 which is secured to the sensor 30. The spring 34 biases the sensor 30 into contact with the webbing 21 and the accumulation of webbing 21 overcomes the bias of spring 34 to position the hook portion 35 of the interposer 33 under the arm 24 as the reel or spool 15 fills. Conversely, as webbing 21 is withdrawn from the drum 15 the webbing 21 falls away from the sensor 30 but the hook portion 35 of the interposer is held in position by the holding action of the arm 24 until a slight retraction of the webbing 21 occurs causing the arm 24 to free itself from the hook portion 35 of the interposer 33 and then the bias of the spring 34 pushes the interposer 33 away from the arm 24 and against the stop 36. This arms the direction sensor 23 so that the radial arm 25 can rotate with further withdrawal of webbing 21 and lock the pawl element 28 by tilting the pawl element 28 into engagement with the teeth 29 on the ratchet flanges 16 and 17.

On retraction of the webbing 21, the counterrotation of the direction sensor 23 and pawl controlling arm 25 together with the unlock rotation of ratchet teeth 29 causes the pawl bar 28 to move out of contact with the ratchet flanges 16 and 17 for chatter-free rewind. Any withdrawal of webbing is resisted by a locking motion of the pawl 28 until the webbing 21 increases in size on the drum 15 to tilt the condition sensor 30 thereby engaging the interposer 33 in blocking the locking action of the direction sensor 23. The sensor 30 overcomes the spring 34 on rewind. When the interposer 33 hooks or engages the arm 24, the rotation of the sensor 23 is prevented and withdrawal of webbing 21 can then occur as desired until the interposer 33 is freed from the blocking action on the sensor 23. While the interposer is engaged, the direction sensor 23 slips in its frictional engagement with the shaft 19.

Figure 2:
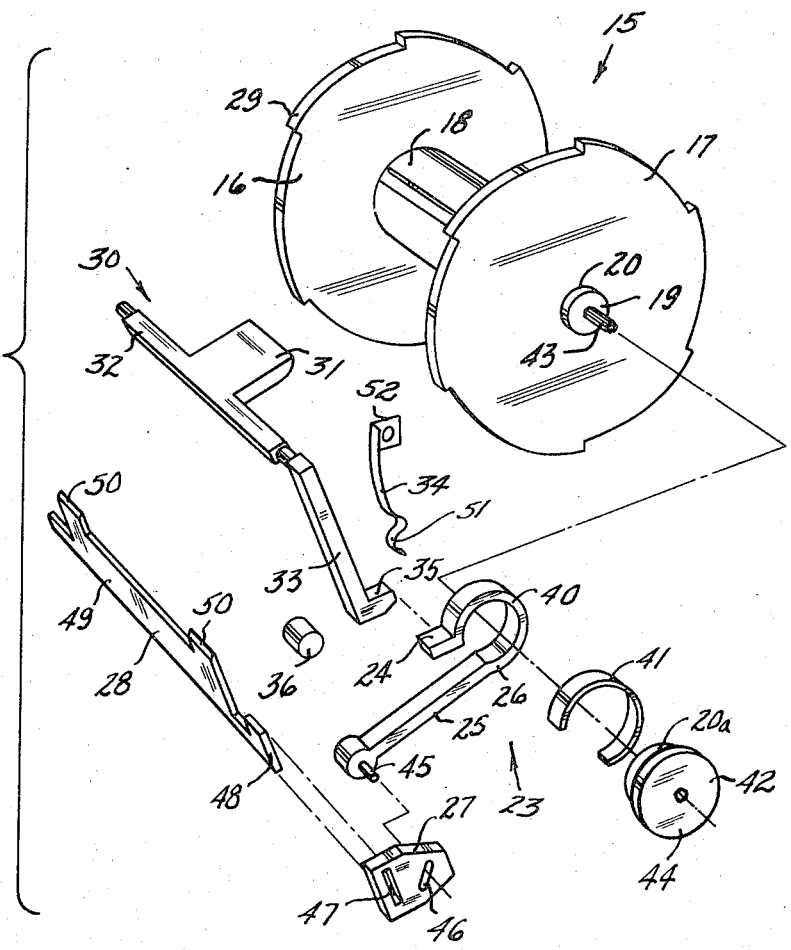
FIG. 2 is a partially exploded perspective view of the primary elements in the structure illustrated in FIG. 1 and releasable for locking in accord with amount of webbing on the spool.

In FIG. 2 the direction sensor 23 can best be understood in its relationship to the condition sensor 30 and the pawl element 28 responding to the mechanical programming as described.

The direction sensor 33 is bifurcated and spring-like, the bifurcations forming the arms 24 and 25 which arms extend generally radially of the arcuate portion 40 as shown. Hence, the arcuate portion 40 is sprung over the shaft 19 to engage compressibly the shoulder 20 of the shaft 19 in a frictional relationship and hence moves in the same direction as the shaft 19 and drum 15. To augment or supplement the frictional grip on the shaft 19, a circlip spring 41 is preferably clipped over the arcuate portion 40 of the direction sensor 23 urging tight contact with the shaft 19 or extension thereof and strengthening the arms 24 and 25 as they join the arcuate portion 40 of direction sensor 23. Further, frictional reliance is increased by using an extension 42 of the shaft 19. The extension 42 is pressed over the splined stub 43 of the shaft 19 so that the extension 42 rotates with the shaft 19. Then the surface area of shoulder 20a is increased as desired over the shoulder 20 and cap portion 44 of the extension 42 acts as an axial retainer for the assembly of direction sensor 23.

On the outboard end of the arm 25 is connector pin 45 which operably connects the arm to the pawl cam plate 27 at the slot 46. The slot 47 through the plate 27 is fitted over the rectangular end 48 of the pawl bar element 28. Accordingly, as the plate 27 is rotated, the pawl bar 28 is rotated about an axis adjacent the lower edge 49 of the pawl bar element 28. This rocking or tilting action is caused by the eccentric or crank movement of the plate 27 when the pin 45 is rotated on the arm 25 of the direction sensor 23. In the fully disengaged position, the pawl element 28 rests against a generally triangular pawl opening in the frame flanges 13 and 14, thus acting as a stop and preventing the direction sensor 23 from further angular displacement on rewind. The bevel or chisel edges 50 of the pawl element 28 are in registry with the rotation path of ratchet flanges 16 and 17 of the drum 15 and the angle of engagement is selected for positive stopping of the drum 15 in one direction with easy kick-out of the pawl element 28 when the drum 15 is moved in the other direction of rotation. The spring 34 is of the flat spring type and bent at 51 to provide smooth engagement against the interposer 33. The tab 52, transverse to the curved plate of the spring 34, provides a mounting means as shown.

In the FIG. 1, the web 53 of the frame 12 is provided with an opening 54 which permits the retractor 11 to be secured to an automobile frame structure. Then, at the outboard end of the webbing 21, a hardware element 55 is provided such as a buckle or tongue and is secured to the webbing 21 as shown.

The FIGS. 3, 4, 5 and 6 assist in demonstrating the operation of the retractor structure 11 described in the FIGS. 1 and 2.

In FIG. 3 the drum 15 has fully retracted the webbing 21 and the condition sensor or feeler 30 urges the interposer 33 into blocking engagement under the arm 24 of the direction sensing structure 23 thereby preventing any rotation of the direction sensor 23 if the webbing 21 is withdrawn. In this position, the pawl element 28 is held out of engagement with the ratchet flanges 16 and 17 by the arm 25 acting on the plate 27.

In FIG. 4 withdrawal of webbing 21 is proceeding and the interposer 33 prevents the pawl 28 from being activated by the direction sensor 23 despite the fact that the condition sensor 30 is now clear of the webbing 21 on the drum 15. This is because during withdrawal the arm 24 is urged to hold the interposer 33 by engagement with the hook portion 35 from falling out of the rotation restraining position as shown.

In FIG. 5 slight retraction has occurred. Actually, retraction may continue so long as the webbing condition feeler 31 is not moved. On such retraction, the direction sensor 23 rotates with the drum 15 releasing the interposer 33 and the spring 34 thereupon biases the interposer 33 and hook 35 out of blocking engagement of the direction sensor 23. The arm 25 still holds the pawl element 28 out of ratchet engaging position but the system is thereupon armed so that any subsequent withdrawal of webbing 21 will cause corresponding rotation of the direction sensor 23 and movement of the arm 25 causing locking motion of the pawl 28 into the path of ratchet teeth 29 and stopping webbing withdrawal.

On full retraction, the webbing 21 engages the feeler 31 of condition sensor 30 and tilts the interposer 33 against the bias of spring 34 under the arm 24 in a pawl lock preventing position. The hook portion 35 easily falls beneath the arm 24 which is slightly elevated on retraction in accord with the rewind bias of the direction sensor 23. Accordingly, the condition of FIG. 1 is restored. This provides an excellent automatic locking retractor function.

FIGS. 7 and 8 show a variation of the invention adapted to vehicle sensitive inertial operation in which the direction sensor 23' is acted upon by a condition sensing element 30' and where the condition sensing element 30' positions an interposer 33' for blocking closure of a pawl element against ratchet teeth 29' and upon release of the interposer 33' the pawl element is closed against the ratchet teeth on withdrawal of webbing 21. The frame 12' is somewhat modified from the structure of FIG. 1 but the prior description is adequate and the drum 15' is reversed in rotation and only one ratchet flange 16' is provided. The condition sensor 30' is secured to the frame 12' on the opposite side from the spring motor 22' for retraction and is arranged as shown (see also FIG. 11) so that the pendulum element 61 depends in a generally parallel position to the flange 13'. The pendulum comprises the weight 62, a coaxial connecting stem 63 and a cap 64. The cap 64 suspends the pendulum element 61 through contact with a circular raised knife edge 65 acting against a circular internal bevel 66 in the cap 64. The support element 67 is a platform supported by the frame 12' and secured to the pendulum frame and pivot support 68. A pivot clevis 69 is also supported by the pivot support 68 as best seen in FIG. 8 and the screw 70 provides a pivot pin for the interposer arm or hook 71. The interposer element 71 is substantially L-shaped, the leg 72 on one side of the pivot 70 moving in a plane path registering with the axis extension of the pendulum element 61. Substantially at register with the pendulum axis an adjusting screw 73 is threadably through the arm 72 and is movable toward and away from the pendulum cap 64. The interposer arm 74 is in blocking engagement with the direction sensor 23' so long as the pendulum element 61 is in the depending position. However, on inertial imbalance as by a sudden deceleration or acceleration, the pendulum 61 shifts from vertical dependency and assumes an arcuate position which tilts the cap 64 on the knife edge 65 (FIG. 11) whereupon the interposer 71 is tilted out of blocking engagement with the direction sensor 23' by hook engagement with the radial arm 24'. The arm 25' is connected by a pivot 45' to pawl plate 27', and tilts the pawl element 28' into ratchet locking engagement if webbing 21 is withdrawn from the drum 15'. In the construction of FIGS. 7 and 8 the direction sensor 23' is provided with an auxiliary arm 75, intermediate arms 25' and 24' and a tension spring 76 is connected between the arm 75 and the arm 25', as on pins 77 augmenting the friction on the shaft 19' by the arcuate portion 40' closing on the shaft 19' or the shoulder 20a of the friction inducing cap element 44' pressed on the spline extension 43'. An antifriction washer 78 between the frame 12' and the direction sensor 23' reduces drag at the interfacial contact between frame 12' and direction sensor 23'.

The operation of the structure shown in FIGS. 7 and 8 is clarified by the FIGS. 9, 10 and 11. In FIG. 11 the condition sensor 61 (inertial) was described. In FIG. 9 the pendulum 61 is in the rest position with or without damping and the pendulum cap 64 is in contact with the interposer lever 71 at the arm 72. The arm 74 of the interposer 71 blocks rotation of the direction sensor 23' by hooking under the arm 24' so that withdrawal or retraction of the webbing 21' for coupling or uncoupling the buckle element 55' is accomplished freely and smoothly in accord with harness movement and wearer movement against the spring motor 22' urging rewind of the webbing 21. Accordingly, as shown in FIG. 9 at inertial balance, the direction sensor 23' cannot lock the pawl 28' against the ratchet teeth 29'.

In FIG. 10 as inertial imbalance is sensed by relative movement of the condition sensor pendulum 61, the interposer or latch 71 is tilted out from under the arm 24' and the direction sensor 23' is free to rotate the pawl cam plate 27', as shown, when withdrawal of webbing 21' occurs and the pawl tooth 50' is shown engaging the ratchet tooth 29' blocking further withdrawal. On retraction, the condition of FIG. 9 is restored, the arm 24' moving to allow the interposer latch 71 to block any locking of the pawl 28'.

A further modified inertial construction is shown in the FIGS. 12, 13, 14, 15 and 16. In the modification of these figures, the frame 81 is channel shaped but more elongate to accommodate an inertial condition sensing structure between the flanges 83 and 84 of the channel shaped frame 81. The direction sensing structure 85 comprises a bifurcated friction gripping element 86 with two radial arms 87 and 88. The arm 87 extends to engagement with an interposer or latch 89 which is an extension of an L-shaped lever 90 operably connected to the condition sensing structure 82 as by contact of the lever arm 91 against the cap 92 of the pendulum element 93 depending from the cradle 94 which spans the gap of the frame 81.

The spindle drum or reel 96 is journalled in the frame 81 as shown and provides a storage receptacle for webbing 97 wound on the drum 96 and biased toward rewind by the spring motor housed in the housing 98 as well known. The drum 96 has a pair of ratchet flanges 99 and 100 and a shaft 101 which includes a splined extension 102 which is pressed through a central opening 103 in a shaft cap element 104 to provide an axial retainer for the direction sensing element 86 and a friction engaging shoulder 105 over which is fitted the bifurcated clip-like gripping element 106 from which extends the arms 87 and 88 in a radial manner. The arcuate portion 107 resiliently grips the shaft 101 or extended surface 105 and rotates therewith. The circlip spring 108 fits over the arcuate portion 107 enhancing the friction as before mentioned. A pin 109 at the end of the arm 88 provides a connecting means in the slot 110 of the pawl cam plate 111. The plate 111 includes a separate slot 112 which receives the end 113 of the pawl bar element 114 having the bevel teeth 115 which are in tilting register with the path of the ratchet teeth 116 on the ratchet flanges 99 and 100 of the drum 96. By reference to FIG. 16, the condition sensor 82 is best understood depending from the cradle 94 by its cap 92 in contact with the lever 91 of the interposer assembly 90. The cap 92 is connected to the weight 118 by the stem piece 119 and the cap 92 rests on the circular knife edge surface 120 and upon tilting of the sensor 82 the pendulum shifts relative position and tilts the lever arm 91. Displacement of the arm 91 allows the direction sensor 86 to be moved with withdrawal of the webbing 97 toward tilting the pawl 114 into lock relation with the ratchet flanges 99 and 100.

The operation is best understood by reference to the FIGS. 14 and 15. When inertial forces are balanced or are stabilized within the damping range applied, the pendulum 118 depends as shown and the interposer or latch 89 is hooked under the arm 87 preventing rotation on withdrawal of webbing 97. The arm 88 of the direction sensor is thus prevented from moving the pawl plate 111 so that the pawl bar 114 cannot lock the ratchet flanges 99 and 100. Withdrawal and retraction of webbing 97 occurs smoothly and without interruption under the bias of the rewind spring motor in housing 98. However, on sudden acceleration or braking, for example, the pendulum changes position as shown in FIG. 15. This trips the lever 91 as the cap 92 rises and removes the interposer 89 from engagement with the arm 87 and any movement of withdrawal felt on the webbing 97 locks the pawl 114 against the ratchet teeth 99 and 101 since the pawl 114 follows the friction induced movement of the direction sensor 86, the rotation of the pawl 114 being counterclockwise into the path of the teeth 116. This inertially locks the retractor drum 96 and prevents further webbing withdrawal. Retraction causes restoration of the condition in FIG. 14.

It should be noted that in each instance of pawl locking, the condition sensed has removed the interposed barrier to pawl locking action and then the direction sensor is permitted to work to move the pawl into locked condition on withdrawal or moves the pawl positively away from ratchet contact on retraction. This permits vehicle sensitive and webbing sensitive inertial control as well as automatic locking control using the same construction. Since very little force is actually felt by the interposer elements, the direction sensing elements and the pawl cam plate, these may be made of lightweight durable plastic or resin material having selected friction properties and suitable dimensional stability. This results in substantial economy and the parts can be generally interchanged from one model to another with only a few exceptions. Combination installations are possible and the structural simplicity tends to increase reliability of action.

Having thus described a pawl lock for retractors, others skilled in the art will appreciate obvious changes, modifications and improvements within the skill of the art and such changes, modifications and improvements are intended to be included herein limited only by the scope of the hereinafter appended claims.

We claim:

1. A pawl lock for seat belt retractors having a frame, a spool of webbing journalled in said frame, a spring motor biasing said spool to wound-up condition, a ratchet flange on said spool, a pawl movable toward and away from said ratchet in selected prevention of withdrawal of webbing from said spool comprising:
   a stub shaft secured to said spool and extending axially therefrom;
   a direction sensing member in friction compression relation on said stub shaft and slippably rotatable therewith and having a first arm extending substantially radially outwardly therefrom and a second arm extending to an operable connection with said pawl and biasing said pawl toward engagement with said ratchet as said webbing is withdrawn from said spool and biasing said pawl away from engagement with said ratchet during rewinding;
   a disabling latch swingable beneath said first arm and preventing rotation of said direction sensing member during withdrawal of webbing from said spool until said disabling latch is pivoted out of blocking relation of said direction sensor; and
   a condition sensing element connected to move said disabling latch toward or away from said direction sensor.

2. A pawl lock structure in accord with claim 1 wherein said condition sensing element is a webbing feeler.

3. A pawl lock structure in accord with claim 1 wherein said condition sensing element is an inertial sensor.

4. A pawl lock structure in accord with claim 3 wherein said inertial sensor is of the pendulum type.

5. In a seat belt retractor, the pawl lock combination comprising:
   a retractor spool having webbing wound thereupon and having a ratchet secured thereto for rotation therewith and said spool rotatable in a frame and driven to rewind by a motor;
   a bifurcated sensing element secured to the shaft of said spool for frictional rotation therewith;
   a pawl element connected to said sensing element at one of the bifurcations thereof and movable by said sensing element toward said ratchet of said spool on withdrawal of webbing from said spool and away from said ratchet on retraction of said webbing to said spool;
   an interposer blocking one direction of travel of said direction sensing element; and
   a condition sensing element operably connected to said interposer, said condition sensing element moving said interposer toward and away from blocking said direction sensing element.

6. The combination of claim 5 wherein said condition sensing element is a webbing feeler.

7. The combination of claim 5 wherein said condition sensing element is an inertial sensor.

8. The combination of claim 7 wherein said inertial sensor is a pendulum.

9. A pawl lock construction for safety belt retractors comprising:
   a spring rewound ratchet flanged webbing drum rotatably connected to a shaft;
   a frame journalling said drum;
   webbing stored on said drum and secured thereto;
   a bifurcated spring element compressibly over said shaft of said drum and movable frictionally with said drum;
   a pawl bar operably connected to one of said bifurcations of said spring element and movable toward and away from interference engagement with said ratchet flanges of said drum;
   an interposer element selectively blocking said bifurcated element from rotation on withdrawal of webbing from said drum by engagement with another of said bifurcations; and
   a condition sensor connected to said interposer and selectively moving said interposer toward and away from blocking engagement with said bifurcated element.

10. The combination as set forth in claim 9 wherein said bifurcated spring element includes supplemental friction inducing bias.

11. The combination as set forth in claim 10 wherein said bias is provided by a spring clamping said bifurcations in compressible relation around said shaft.

* * * * *

UNITED STATES PATENT OFFICE
CERTIFICATE OF CORRECTION

PATENT NO. : 3,873,041
DATED : 1975 March 25
INVENTOR(S) : Robert J. Rumpf and Wallace C. Higbee It is certified that error appears in the above-identified patent and that said Letters Patent are hereby corrected as shown below:

Column 4, line 26, change "for" to read --- from ---

Signed and Sealed this seventh Day of October 1975

[SEAL]

Attest:

RUTH C. MASON
*Attesting Officer*

C. MARSHALL DANN
*Commissioner of Patents and Trademarks*